Patented Nov. 8, 1938

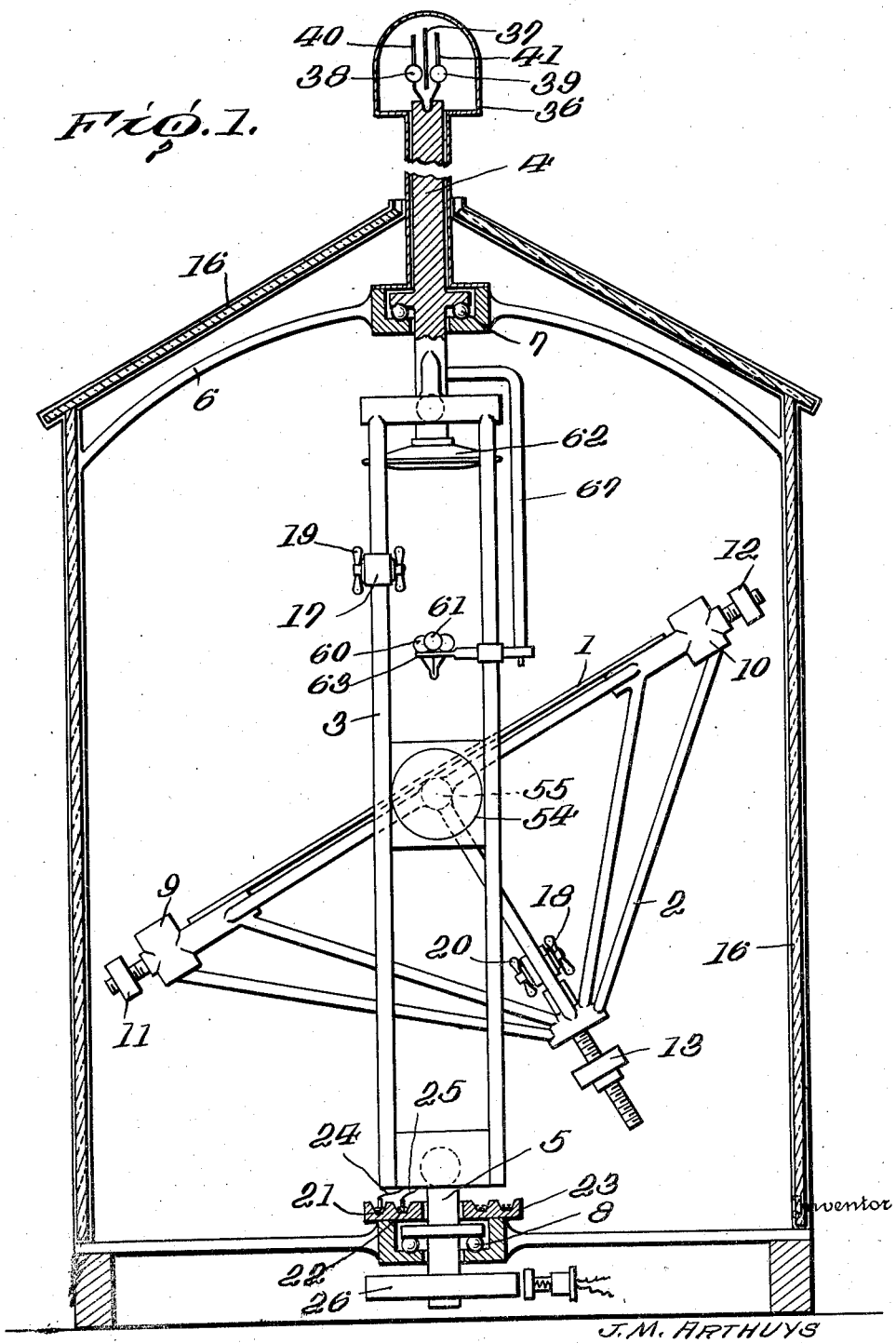

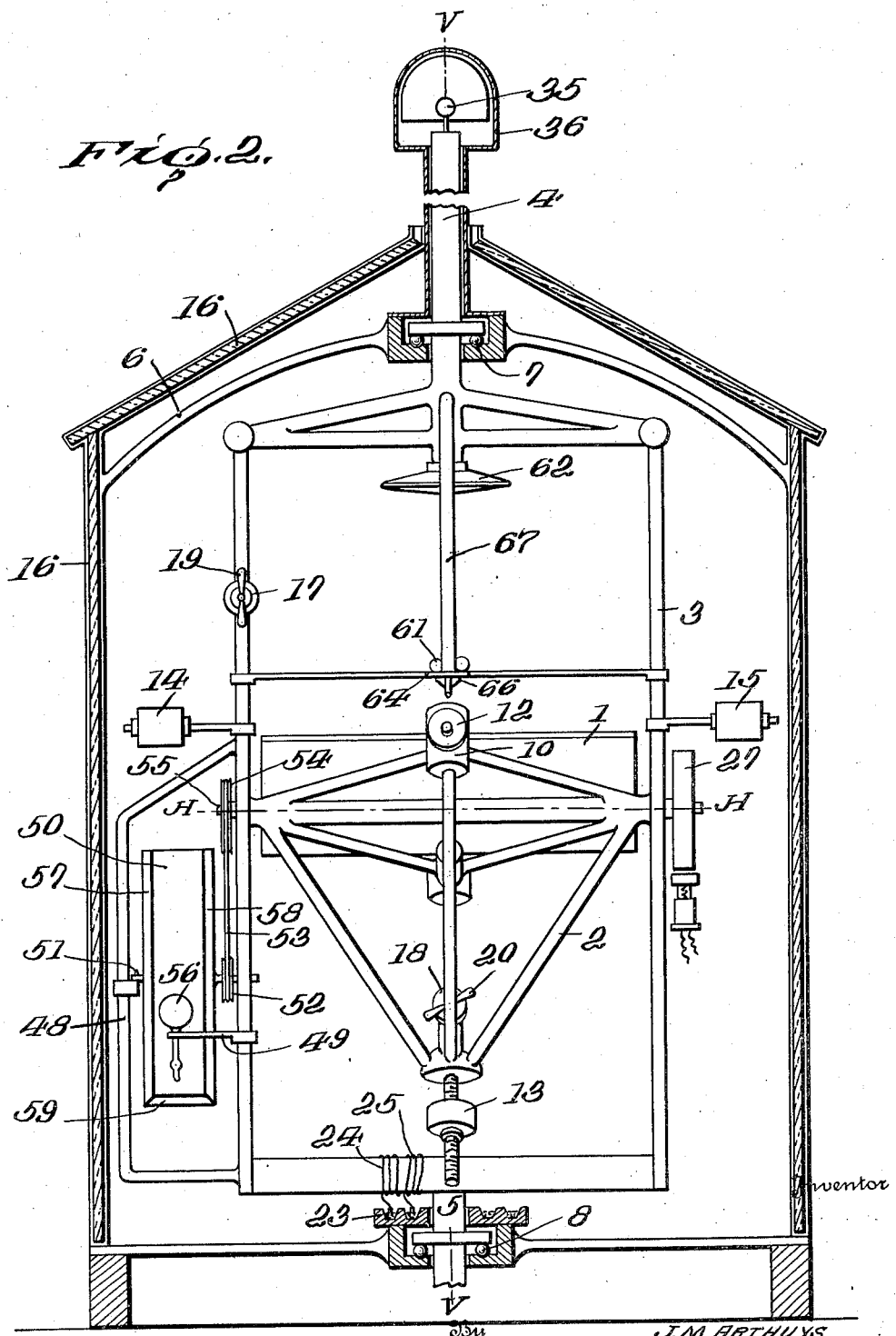

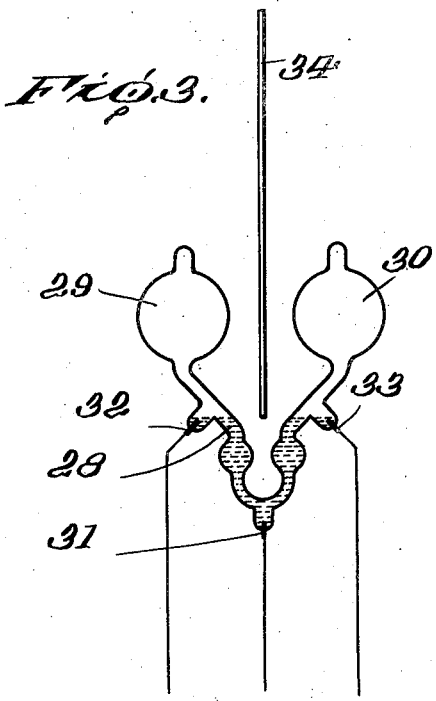
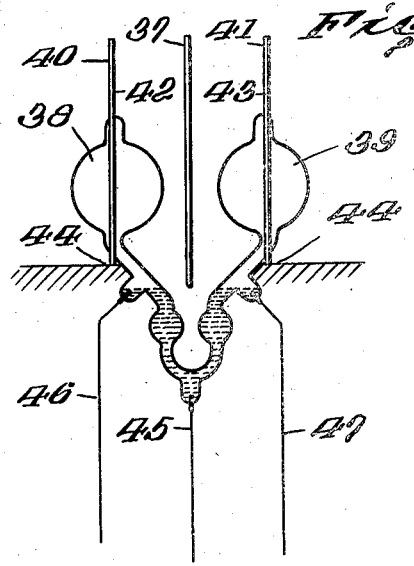
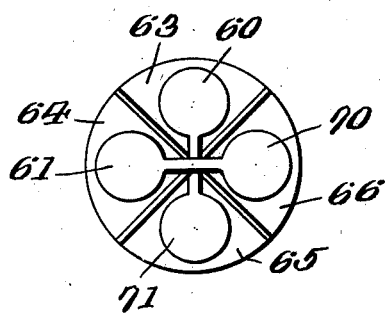
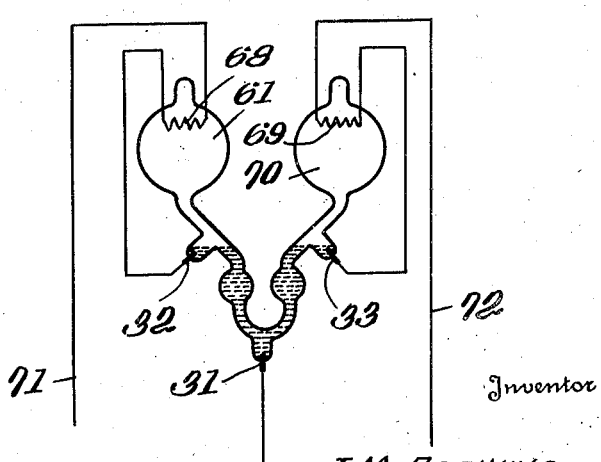

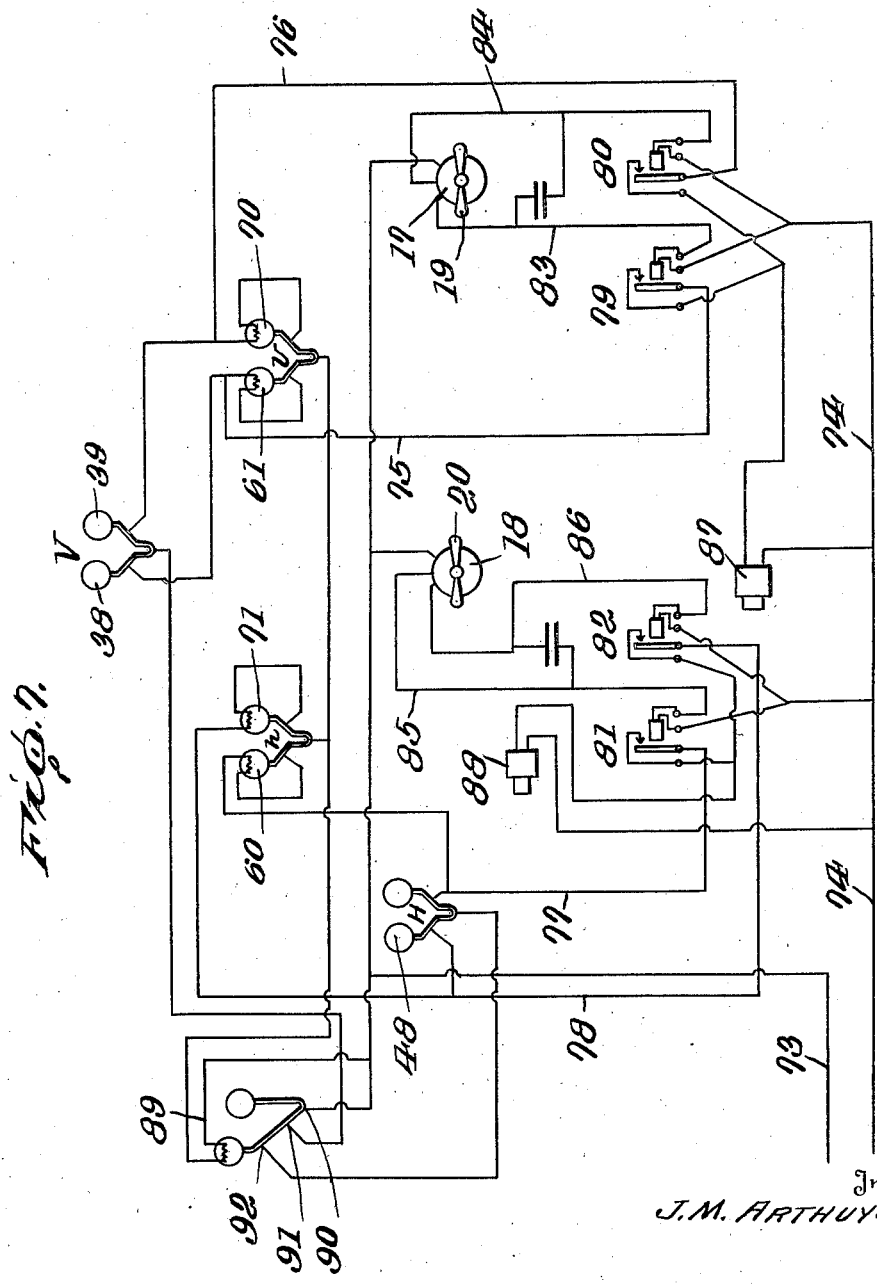

2,135,997

UNITED STATES PATENT OFFICE 2,135,997

AUTOMATIC HELIOSTAT

Jacques Marie Arthuys, New York, N. Y., assignor to "Arthel" (Societe d'Exploitation des brevets Jacques Arthuys), Paris, France, a corporation of France Application October 3, 1936, Serial No. 103,943
In France October 3, 1935

10 Claims. (Cl. 88—25)

My invention relates to a new and improved and greatly simplified heliostat of the type in which the movement of a mirror, supported so as to be driven by one or more motors about two axes substantially perpendicular to each other, is controlled by the solar rays in such manner that the direction in which are reflected the rays incident on the movable mirror remains fixed in space, despite the change in the positions of the sun and mirror with respect to each other.

Devices of this general type, in which the mirror is adapted for movement about two axes, the first a comparatively fast movement for finding the sun after a prior disappearance such as going behind a cloud or setting at evening and for holding the same, and the second a slow movement providing a fine adjustment permitting the mirror to follow with precision the apparent movement of the sun across the sky, are old in the art. The two movements referred to have been obtained heretofore either by two different motors or by means of two transmissions having different reduction ratios, either of which expedients add greatly to the size, complexity and cost of the installation. Especially are these disadvantages emphasized in the case of an installation of considerable capacity, employing a mirror of large dimensions, in which case the movable supports of the mirror have considerable weight and demand considerable power for their rapid movement.

My present invention overcomes these disadvantages to a considerable extent: 1, by reducing the friction between the moving parts to a minimum; 2, by providing a substantially self-contained installation; 3, by avoiding external mechanical connections, and 4, by constructing the rotating parts so as to have large moments of inertia relative to the axes about which these parts rotate. The value of the large moments of inertia referred to can be seen readily when it is considered that when a small starting and energizing couple of constant value is used to energize these said moving parts of large inertia, mounted in anti-friction manner, these parts are accelerated uniformly, beginning at a very slow velocity, say one-tenth of an angular degree for the first second, progressively up to say ninety angular degrees at the end of 30 seconds, the rapid movement being used to seek and hold the sun, and the slow or starting phase being used to follow the sun with precision. This last-mentioned use of the rotating couple is possible due to the fact that intermittent impulses are imparted, bringing the said couple into and out of operation, under the influence of the sun during its slow, apparent march across the skies.

In the device there is a movement about the vertical axis which is secured by the compulsion of an electrical motor and its propellers. The vertical frame is in perfect balance, and extremely light. If it were heavy the power necessary to move it on and to start it in motion would have to be greater, or else it would act more slowly, resulting in the motion of this frame beginning too slowly. Thus would the accuracy of the device suffer. On the other hand, if it were too light, the start would be easy, but the increase of the motion, that is, the acceleration, would be too slow. The device, according to the invention, requires very slow motions when they are short, following the sun, and the motion must be rather rapid when it has a certain duration, or when the device has to catch the sun back; then it is understandable that with the means used, in this device the central part of the frame must be light, and the weights or masses as far as possible from the center.

One preferred embodiment of my invention is shown, solely by way of illustration, in the accompanying drawings, wherein:

Figs. 1 and 2 are two elevations at 90° from each other;

Figs. 3–6 are details of various contact-makers; while

Fig. 7 is a diagram of connections.

Referring to Figs. 1 and 2, a mirror 1 is shown as fixedly mounted in a cradle 2 which in turn preferably is journalled about a horizontal axis H—H, in means such as a frame 3, shown as pivoted about a vertical axis V—V. In the present instance this frame 3 is provided with axial shafts 4 and 5 extending from opposite ends thereof, the shaft 4 for example, being depicted as carrying the frame 3 by means of the pivotal contact of the shaft 4 with the support 6, shown as arched, through the intermediary of suitable, preferably anti-friction bearings, such as the ball-bearing 7. The shaft 5 rides in a suitable thrust bearing, preferably anti-friction, in nature, such for example as the ball bearing 8.

While the cradle and frame 3 may be constructed of any suitable material, I have found that welded steel tubing is highly satisfactory, ensuring great rigidity and extreme lightness, except where considerable weight is actually desired.

If desired, the cradle 2 may also be mounted on needle bearings, to minimize the friction.

In order to increase the moment of inertia of the apparatus, relative to its axes of rotation, for purposes previously discussed in detail, two fixed masses 9 and 10 are provided on the lateral ends of the cradle 2, while additional and adjustable masses 11 and 12 are provided adjacent the said masses 9 and 10, a still further adjustable mass 13 being provided at the free, longitudinal end of the cradle 2, where perfect equilibrium is ensured. The masses 9–12 inclusive, being remote from the axis H—H, give the cradle a large moment with respect thereto. The large masses 14 and 15 (Fig. 2) on the frame 3, ensure a large inertia moment of the whole movable assemblage with respect to the V—V axis.

As shown, a housing 16, which is constructed of any suitable material, but which in the present instance has walls and roof of glass, serves to enclose the entire assembly, primarily in order to shield the movable mirror 1 from the action of the wind. It is also to be noted that I prefer not to have any mechanical connection of the movable parts 2 and 3 with the exterior, the drive motors for the said movable parts preferably being mounted directly on these latter.

Accordingly, in the embodiment illustrated, two small electric motors 17 and 18 are provided, the first on the frame 3 and the second on the cradle 2, the said motors being shown as having suitable means, such as propeller screws or blades 19 and 20, respectively, for causing the frame 3 and cradle 2 to rotate about their respective V—V and H—H axes.

If desired, it would be possible to have the rotors of the motors keyed respectively to the horizontal shaft of the cradle 2 and to the vertical shaft of the frame 3, the stators of the motors then being fixed respectively to the frame 3 and the base of the apparatus.

Cups or annular channels 21 and 22 are shown (Fig. 1) as provided on the upper side of the base of the housing 16, these channels 21 and 22 being filled with mercury, current being supplied to the cups by suitable fixed connections, not shown. The channels 21 and 22 are preferably formed in a plate 23, preferably of insulating material, which is integral with the base of the housing 16. From the channels 21 and 22 the current is supplied to the motors 19 and 20 by suitable conductors 24, 25, preferably having a diameter of only a few hundredths of a millimeter, so as to avoid interfering mechanical reactions.

Electromagnetic brakes 26 (Fig. 1) and 27 (Fig. 2) are disposed respectively on the shaft 5 of frame 3 and the shaft H—H of cradle 2, in such manner as to exert a powerful braking action on the said shafts in stopping the rotation of the same.

So that the same apparatus is available both for rapidly finding the sun and retaining an approximate focus thereon, and for causing the slow movements of the mirror 1 subject to the movements of the sun, my apparatus comprises two temperature-responsive or thermometric contact-makers for controlling the rotation about each axis, or four contact-makers in all. One contact-maker of each set of two contact-makers is actuated directly by the solar rays incident thereon, and is so disposed as to be scanned as soon as the sun appears, and to bring the mirror 1 into approximately the position desired. The other contact-maker of each set is actuated by the reflection from the mirror 1 of the solar rays incident on the latter, so that this contact-maker is scanned only after the position of the mirror has been approximately adjusted. This second contact-maker or relay is intended for the exact regulation of the position of the mirror.

Referring to Fig. 3, it will be seen that these thermometric contact-makers are of the known mercury-filled type. It will be seen that a curved neck or yoke 28 of vitreous material is filled with mercury, terminating at its ends in enlarged, vitreous bulbs 29 and 30, these bulbs being filled with a suitable gas such as hydrogen. If necessary, these bulbs have a coating or the like of a suitable heat absorbing substance, such as black paint, for increasing the sensitivity and quickness of response of the contact-makers. Three electrodes are provided in the said neck, one of which electrodes, the central electrode 31, is always immersed in the mercury, while the other electrodes 32 and 33, flanking in symmetrical manner the said central electrode, are adapted to contact the mercury from time to time in response to the rays of the sun. A mirror 34, having both its surfaces of reflecting material, is shown as disposed between the bulbs 29 and 30, so that at a given instant, the reflected rays of the sun can be incident on but one of said bulbs. If say, the rays are incident on the bulb 29, then the pressure of the hydrogen builds up due to its greater kinetic energy, so that it forces the mercury downwardly, away from the contact 32, and completes a circuit through contact 31 and 33 whereby, by means of suitable external connections, the motor controlled by this and the corresponding control circuit, is brought into rotation in a predetermined direction. If now, it were the bulb 30 which had been exposed to the reflected solar rays, the circuit would have been closed between the contacts 31 and 32, and the rotation of the motor would have been in the opposite direction.

It is to be understood that the contact-maker described in connection with Fig. 3 is simply typical of the type which I employ. No disclosure has yet been made of the manner in which the contact-maker is used in my apparatus, and such description will be developed hereinafter.

A contact-maker indicated generally at 35 is shown at the top of Figs. 1 and 2, and in greater detail in Fig. 4. This contact-maker controls the rough, rapid adjustment of the frame 3 about the vertical axis V—V, so that the gas-filled bulbs thereof are adapted to receive its energy at least in part directly from the solar rays. Another contact-maker will of course be provided for similar rough adjustment about the horizontal axis. The elements of the contact-maker 35 are shown as protected by a vitreous bell jar 36. Referring to Fig. 4 it will be seen that in order to reduce the bulk of the contact-maker, the mirror 37 separating the two bulbs 38 and 39 is made of small height. Preferably, two additional mirrors 40 and 41 are provided, disposed parallel to the mirror 37 and arranged about the bulbs 38 and 39, respectively, the inner surfaces 42 and 43 thereof being blackened so as not to reflect. If, for example, the sun is to the left of the contact-maker as shown in Fig. 4, the rays will be directly incident on the outer face of the bulb 38, the mirror 42 cooperating in this action. Further rays will impinge on the left face of the mirror 37 and will be reflected, part onto the bulb 38, and part onto the blackened surface 42 of the mirror 40, where, by conduction, the heat stored will in part be transferred to the hydrogen in the bulb 38. In order to increase the amount of light directed onto the bulbs 38 and 39, I may, if desired provide a mirror 44 disposed horizontally beneath the bulbs, thereby reflecting the solar rays upwardly and obliquely onto the bulbs. Contacts 45, 46, and 47 correspond respectively to the contacts 31, 32 and 33 of Fig. 3.

A second contact-maker, indicated generally at 48, is shown in Fig. 2 for controlling the rough adjustment of the device about the horizontal axis H—H, in a manner broadly similar to the control exercised by the contact-maker 35 with respect to the V—V axis. The contact-maker 48 is shown as affixed rigidly to the frame 3 by any suitable means such as the arm 49. The mirror 50 of this contact member preferably is pivoted on the frame 3, so as to rotate about a horizontal axis which is offset with respect to the horizontal axis H—H of the mirror 1. Preferably, the mirror 50 is so connected with the rotatable mirror 1 as to rotate twice as rapidly as the latter, the connection being such that the mirror 50 is in a vertical position when the mirror 1 is horizontal. The arrangement is such that while the mirror 1 moves through a vertical plane in dependence upon the apparent movement of the sun across the sky, the angular relation between the sun and mirror is maintained at a value such that the rays reflected by the mirror 1 are always projected in a vertical direction. Use is made here of the physical law that the angular trajectory of the reflected ray is twice that of the angle swept by the mirror.

To accomplish the foregoing object the mirror, at one of its pivot points, is supported by a knife edge 51 from the frame 3, it being shown as terminating at the other end of its horizontal axis in a pulley 52 suspended by means such as a cable 53 from a second pulley 54 fast on the shaft 55 of the cradle 2, so that the cable 53 serves both to support and to rotate the mirror 50. One of the bulbs 56 of the contact-maker 48 is shown in Fig. 2. In operation, the sun rays are incident on the bulb 56 or its mate, either through direct or reflected irradiation, and the circuits operated thereby control the motor 18, thereby bringing the mirror approximately into the proper horizontal adjustment. To increase the sensitivity of the contact-maker, the mirror 50 is supplemented by additional, obliquely-arranged mirrors 57, 58, and 59.

The foregoing has described in detail the manner of and means for accomplishing the rough adjustment of the mirror 1, so that the latter can quickly find and thereafter hold the solar rays. Now will be explained the means for controlling the precise movement of the mirror 1 through the horizontal and vertical planes in response to apparent movements of the sun, to maintain constant the direction of reflection from said mirror.

These precise controlling means are shown as taking the form of two contactors or contact-makers, 60 and 61 (Figs. 1, 2 and 5), disposed at right angles to each other and above the mirror 1 (or below this mirror in the case where the mirror reflects the light vertically downward), and they are scanned by part of the beam which is reflected from the Mangin mirror 62. This mirror 62 is shown in Figs. 1 and 2 as being disposed centrally above the mirror 1, and reflects the light incident thereon from the mirror 1 to the elliptical mirrors 63, 64, associated with the contact maker 60, and elliptical mirrors 65, 66, associated with the contact-maker 61, so as to produce small images of the sun on these latter, which in turn, reflect the solar rays onto the bulbs of the corresponding contact-makers. As shown, the contact-makers 60 and 61 and the mirrors 63, 64, 65 and 66 are supported by an arm 67 integral with the frame 3.

Details of a preferred embodiment of the contact-makers 60 and 61 constituting the precise controlling means are shown in Fig. 6, wherein filaments 68, 69 are illustrated as disposed in the interior of the bulbs 61, 70 of the contact-maker 61, or bulbs 60, 71 (Fig. 5) of the contact-maker 60, these filaments being mounted in series with the circuits controlled by these contact-makers. For example, the filament 68 is in series with the contact or terminal 32 and the line 71, while the filament 69 is in series with the contact or terminal 33 and the line 72. These filaments are provided to compensate for the capillarity of the mercury, which when the contact-maker comes into operation, causes a sudden rise of several millimeters of the mercury column, which column then descends only slowly after the contact-maker is removed from the effects of the solar rays. More precisely, the heat from the filament tends to raise the pressure in the corresponding bulb of the contact-maker, thereby pushing the mercury downwardly, against the action of capillarity, so that the mercury column will be maintained adjacent the electrode 32 or 33 as the case may be, i. e. adjacent the point of rupture, so that the circuit is always broken immediately that the contact-maker passes out of the range of the solar rays.

Referring to Fig. 7, it will be seen that the general circuit connections are illustrated. Therein, conductors 73 and 74 carry the current for energizing the motors 17 and 18. Between the conductor 73 passing directly to the two motors, and the return conductor 74, there are mounted in parallel the thermometric contact-makers h, v, the two heads corresponding to the same rotational direction of the motors of both contact-makers of each motor being mounted in parallel on the conductors 75, 76 and 77, 78. Disposed in association with each of these contacts are electromagnetic relays 79, 80 and 81, 82, the armatures of which relays control the circuits 83, 84 and 85, 86 connected to the conductor 74, the motors rotating in one or the other direction accordingly as one or the other of their relays is excited. Disposed in series with the relays 79, 80 and 81, 82 controlling the motors are the electromagnets 87 and 88 of the brakes for the two movements of the apparatus, so that the excitation of one of the electromagnets and the liberation of the corresponding brake takes place by way of any one of the four conductors.

Finally, the various reasons, the principal of which is to facilitate the functioning of the apparatus, in the morning or after a long cloudy period, a thermometric filament interrupter 89 is provided for disconnecting the contactors for the rough regulation as soon as the image of the sun is formed on one of the four elliptical mirrors. For this purpose the current passing to the central electrodes of the exact regulation contactors 60 and 61 (h and v) passes through the filament disposed in the head of a thermometric contact-maker 89. This interrupter has three electrodes 90, 91, 92, that is to say, two gaps (circuit breakers) and each thereof cuts off the current in one or the other of the rough regulating contactors 38, and 48 (V and H). The current is reestablished in these latter contacts when the precise regulating contacts have not functioned after a certain period of time, since the thermometric interrupter 89 opens the circuit without appreciable delay, but closes it with a certain delay by reason of the slow cooling of its head.

As stated precedingly, the movable mirror 1 of the apparatus constantly reflects the solar rays along the vertical, but either upwardly or downwardly. It is to be understood that if it is desired to pass the reflected rays in any direction other than the vertical there is disposed at the interior or exterior of the glazed housing 10, above or below mirror 1 other mirrors, preferably adjustable, which for greater clearness are not shown on the drawings.

The broad aspects of the invention being disclosed, numerous modifications and adaptations will readily be apparent to those skilled in the art. Only a preferred embodiment of an apparatus carrying out the invention, which has been found useful has been described. Accordingly it is not intended to be limited to the specific details illustrated and described, but all forms are intended to be covered which fall within the spirit and scope of the invention as defined in the following claims.

I claim:

1. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, heat operated relays actuated by the solar rays and controlling said electric motors in such manner that the direction of the rays reflected by the movable mirror remains fixed in space.

2. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, the plane in which rotates each air screw being parallel to the plane of the corresponding frame, heat operated relays actuated by the solar rays and controlling said electric motors in such manner that the direction of the rays reflected by the movable mirror remains fixed in space.

3. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, heat operated relays actuated by the solar rays and controlling said electric motors in such manner that the direction of the rays reflected by the movable mirror remains fixed in space, electromagnetic brakes mounted on the vertical axis of said outer frame and on the horizontal axis of said inner frame to secure the movable mirror in an adjusted position.

4. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, heat operated relays actuated by the solar rays and controlling said electric motors in such manner that the direction of the rays reflected by the movable mirror remains fixed in space, electromagnetic brakes mounted on the vertical axis of said outer frame and on the horizontal axis of said inner frame to secure the movable mirror in an adjusted position, and a transparent glazed housing for enclosing said outer and inner frames supporting the mirror.

5. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, heat operated relays actuated by the solar rays and controlling said electric motors in such manner that the direction of the rays reflected by the movable mirror remains fixed in space, said relays comprising for each motor two relays one of which is placed to be actuated by the incident solar rays whatever may be the position of the sun in respect of the apparatus and causing the motor to bring the movable mirror to the approximate position desired, while the second relay is placed to be actuated by the rays reflected by the movable mirror when said mirror has reached the approximate position desired, causing the motor to bring said mirror to the exact position, and means for automatically disconnecting the first relay as soon as the second relay is operated.

6. Automatic heliostat comprising an adjustably movable mirror, a base, supporting members for said mirror constituted by an outer vertical frame pivotally mounted on said base to rotate about its vertical axis and an inner frame carrying the mirror and journalled within the first to rotate about a horizontal axis, weights secured to said two frames at a distance from their axes in order to give them inertia moments of high value, balancing weights adjustably mounted on said frames, electrical motors secured to said outer and to said inner frame, air screws driven by said motors for rotating said frame about their respective vertical and horizontal axes, heat operated relays actuated by the solar rays and controlling said electric motors in such manner that the direction of the rays reflected by the movable mirror remains fixed in space, said relays comprising for each motor two relays one of which is placed to be actuated by the incident solar rays whatever may be the position of the sun in respect of the apparatus and causing the motor to bring the movable mirror to the approximate position desired, while the second relay is placed to be actuated by the rays reflected by the movable mirror when said mirror has reached the approximate position desired, causing the motor to bring said mirror to the exact position, and means for automatically disconnecting the first relay as soon as the second relay is operated, said relays being constituted by double-acting thermometric contact-makers comprising a U-shaped glass tube with mercury, two glass-bulbs filled with hydrogen and connected to the terminals of said tube respectively, three electrodes penetrating said tube, one at the bottom and one on each side thereof, and a reverser mounted in the circuit of the corresponding motor and actuated upon any one of said hydrogen bulbs being illuminated.

7. Automatic heliostat according to claim 6 wherein the relay controlling the approximate adjustment of the movable mirror in respect of the vertical axis is secured at the top of the outer frame, said relay comprising a first vertical mirror arranged between the hydrogen bulbs of the contact-maker, two other vertical mirrors having blackened inner surfaces disposed above said bulbs and a fourth mirror, horizontally disposed under said contact-maker.

8. Automatic heliostat according to claim 6 wherein the relay controlling the approximate adjustment of the mirror in respect of the horizontal axis is secured to the outer frame and integral therewith, said relay comprising a mirror arranged between the hydrogen bulb thereof and rotatably secured to said outer frame, said mirror being connected to the movable mirror carried by the inner frame in a manner to travel in rotation through double the angle travelled by the said movable mirror about its horizontal axis.

9. Automatic heliostat according to claim 6 comprising a concave mirror receiving a part of the beam reflected by the movable mirror and four elliptical mirrors fed by said concave mirror and reflecting the solar rays received from said concave mirror on the hydrogen bulbs of the relays controlling the exact adjustment of the mirror.

10. Automatic heliostat according to claim 6, wherein an electric heating resistance is provided in the hydrogen bulbs of the contact-makers and connected in series in the circuit of said contact-makers.

JACQUES MARIE ARTHUYS.